US009699831B2

(12) United States Patent
Choi et al.

(10) Patent No.: US 9,699,831 B2
(45) Date of Patent: Jul. 4, 2017

(54) APPARATUS AND METHOD FOR PROVIDING ACCESS POINT FUNCTION IN PORTABLE COMMUNICATION SYSTEM

(75) Inventors: Jong-Mu Choi, Gunpo-si (KR); Keum-Youn Kwon, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 863 days.

(21) Appl. No.: 12/903,499

(22) Filed: Oct. 13, 2010

(65) Prior Publication Data
US 2011/0085528 A1  Apr. 14, 2011

(30) Foreign Application Priority Data
Oct. 13, 2009  (KR) .................. 10-2009-0097182

(51) Int. Cl.
H04W 4/00      (2009.01)
H04W 88/04     (2009.01)
(52) U.S. Cl.
CPC .................. H04W 88/04 (2013.01)
(58) Field of Classification Search
CPC ................................................ H04W 88/04
USPC ....................................................... 370/338
See application file for complete search history.

(56) References Cited

U.S. PATENT DOCUMENTS

| 6,067,297 A * | 5/2000 | Beach ............................ 370/389 |
| 6,282,577 B1 * | 8/2001 | Okanoue et al. ............. 709/250 |
| 7,382,771 B2 * | 6/2008 | Leblanc et al. ............... 370/352 |
| 7,545,783 B2 * | 6/2009 | Caspi ..................... H04W 88/04 370/338 |
| 7,672,695 B1 * | 3/2010 | Rainnie ............. H04W 52/0277 455/127.1 |
| 7,802,088 B2 * | 9/2010 | Jones et al. .................... 713/150 |
| 7,881,267 B2 * | 2/2011 | Crosswy ............. H04M 1/7253 370/338 |
| 7,944,901 B2 * | 5/2011 | Souissi et al. ................. 370/338 |
| 8,229,357 B2 * | 7/2012 | Arena .................... H04W 88/04 370/315 |
| 8,320,913 B2 * | 11/2012 | Levy ........................... 455/435.1 |
| 8,559,369 B2 * | 10/2013 | Barkan .......................... 370/328 |
| 8,625,488 B1 * | 1/2014 | Gogate et al. ................ 370/328 |
| 8,730,914 B2 * | 5/2014 | Souissi ............... H04L 12/2812 370/331 |
| 8,902,926 B2 * | 12/2014 | Hamilton ............ H04W 88/085 370/328 |
| 8,981,924 B2 * | 3/2015 | Yaqub ................ G08B 13/1427 235/375 |
| 9,055,606 B2 * | 6/2015 | Souissi ................. H04W 88/04 |
| 2003/0210700 A1 | 11/2003 | Chen |

(Continued)

FOREIGN PATENT DOCUMENTS

CN    1649358 A     8/2005
CN    101473551 A   7/2009

(Continued)

Primary Examiner — Guang Li
(74) Attorney, Agent, or Firm — Jefferson IP Law, LLP

(57) ABSTRACT

An apparatus and method for providing an Access Point (AP) function of a portable terminal are provided. The apparatus includes an AP function unit for performing the AP function by using the portable terminal in an environment where an AP is not present, and a controller for, if there is a terminal to be connected to the AP, performing connection to the terminal directly without having to perform a process of inputting password information of the AP.

19 Claims, 3 Drawing Sheets

(56) References Cited

U.S. PATENT DOCUMENTS

| | | | |
|---|---|---|---|
| 2003/0231607 A1* | 12/2003 | Scanlon et al. | 370/338 |
| 2004/0131188 A1* | 7/2004 | Wang et al. | 380/270 |
| 2004/0179512 A1* | 9/2004 | Leblanc | H04L 29/06 370/352 |
| 2004/0246915 A1* | 12/2004 | Watanabe | H04W 48/20 370/313 |
| 2005/0144237 A1* | 6/2005 | Heredia et al. | 709/206 |
| 2005/0198221 A1* | 9/2005 | Manchester et al. | 709/220 |
| 2005/0286476 A1* | 12/2005 | Crosswy | H04M 1/7253 370/338 |
| 2006/0126579 A1* | 6/2006 | Kim et al. | 370/338 |
| 2006/0146746 A1* | 7/2006 | Kim | H04L 29/06 370/328 |
| 2006/0221915 A1* | 10/2006 | Gatta et al. | 370/338 |
| 2006/0258285 A1* | 11/2006 | Riddles | H04W 48/20 455/41.2 |
| 2007/0110008 A1* | 5/2007 | Trift | H04W 88/06 370/338 |
| 2007/0146130 A1* | 6/2007 | Hannemann et al. | 340/539.22 |
| 2007/0167174 A1* | 7/2007 | Halcrow et al. | 455/456.2 |
| 2007/0168553 A1* | 7/2007 | Jones et al. | 709/245 |
| 2007/0254727 A1* | 11/2007 | Sewall et al. | 455/574 |
| 2007/0255848 A1* | 11/2007 | Sewall | H04L 29/12066 709/232 |
| 2007/0264965 A1* | 11/2007 | Taniguchi | 455/403 |
| 2007/0274241 A1* | 11/2007 | Brothers | H04L 67/06 370/310 |
| 2008/0039102 A1* | 2/2008 | Sewall | H04L 12/2856 455/445 |
| 2008/0043687 A1* | 2/2008 | Lee | 370/338 |
| 2008/0058031 A1* | 3/2008 | Deprun | 455/574 |
| 2008/0080455 A1* | 4/2008 | Rofougaran | H04B 7/10 370/342 |
| 2008/0112362 A1* | 5/2008 | Korus | 370/331 |
| 2008/0139239 A1* | 6/2008 | O'Connor | 455/552.1 |
| 2008/0198823 A1* | 8/2008 | Shiu et al. | 370/338 |
| 2009/0005005 A1 | 1/2009 | Forstall et al. | |
| 2009/0010191 A1* | 1/2009 | Wentink | 370/311 |
| 2009/0180449 A1 | 7/2009 | Maki | |
| 2010/0227610 A1* | 9/2010 | Jabara et al. | 455/432.3 |
| 2010/0246486 A1* | 9/2010 | Lin et al. | 370/328 |
| 2010/0290442 A1* | 11/2010 | Souissi et al. | 370/338 |
| 2010/0290444 A1* | 11/2010 | Souissi | H04W 88/04 370/338 |
| 2010/0296441 A1* | 11/2010 | Barkan | H04W 12/08 370/328 |
| 2011/0032914 A1* | 2/2011 | Venkateswaran | H04W 88/04 370/338 |
| 2011/0154447 A1* | 6/2011 | Dennis | G06F 21/35 726/4 |
| 2011/0161480 A1* | 6/2011 | Kim | H04L 12/2809 709/223 |
| 2014/0073288 A1* | 3/2014 | Velasco | H04W 4/02 455/411 |

FOREIGN PATENT DOCUMENTS

| | | |
|---|---|---|
| EP | 1 215 853 A2 | 6/2002 |
| JP | 2005-184314 A | 7/2005 |
| WO | WO 2007096884 A2 * | 8/2007 |
| WO | 2009/151452 A1 | 12/2009 |

* cited by examiner

APPARATUS AND METHOD FOR PROVIDING ACCESS POINT FUNCTION IN PORTABLE COMMUNICATION SYSTEM

PRIORITY

This application claims the benefit under 35 U.S.C. §119 (a) of a Korean patent application filed in the Korean Intellectual Property Office on Oct. 13, 2009 and assigned Serial No. 10-2009-0097182, the entire disclosure of which is hereby incorporated by reference.

BACKGROUND OF THE INVENTION

1. Field of the Invention

The present invention relates to an apparatus and method for an Access Point (AP) function of a portable terminal. More particularly, the present invention relates to an apparatus and method for providing the AP function in the portable terminal, and for connecting to a Wi-Fi terminal when performing the AP function.

2. Description of the Related Art

Portable terminals have virtually become necessities of modern life. Thus, service providers and terminal manufacturers are competitively developing differentiated products and services.

For example, the portable terminal has developed into a multimedia device capable of providing various services such as phonebooks, games, Short Message Service (SMS), Electronic (e)-mails, wake-up calls, MPEG-1 Audio Layer 3 (MP3) players, scheduling, digital cameras, Multimedia Message Service (MMS), wireless Internet, and the like.

In order to use a packet data service including the multimedia message and the wireless Internet in the portable terminal, the portable terminal connects to an Access Point (AP) providing the service.

That is, the portable terminal uses the packet data service by transmitting data to the AP, and thus cannot use the packet data service in an environment where the AP is not present. In addition thereto, the portable terminal performs a process of connecting to the AP when using the packet data service.

In the process of connection to the AP, a wireless Local Area Network (LAN) of the AP and the portable terminal is activated and thereafter the portable terminal is allowed to scan the AP. If the portable terminal is the AP, a user of the portable terminal directly inputs password information of the AP so as to enable the packet data service by connecting to the AP.

When performing the aforementioned connection process, the user of the portable terminal needs to know the password information, and performs a process of manually inputting a password of the AP whenever the portable terminal is used, which leads to inconvenience of use.

Accordingly, there is a need for an apparatus and method for simplifying a process of connecting to an AP in a portable terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and method for providing an Access Point (AP) function in a portable terminal.

Another aspect of the present invention is to provide an apparatus and method for simplifying a process of connecting to a neighboring terminal when performing an AP function in a portable terminal.

Another aspect of the present invention is to provide an apparatus and method for allocating a resource for a neighboring terminal of a specific terminal and for connecting to a service provider's network connected to the specific portable terminal by using the resource.

In accordance with an aspect of the present invention, an apparatus for providing an AP function to a portable terminal is provided. The apparatus includes an AP function unit for performing the AP function by using the portable terminal in an environment where an AP is not present, and a controller for, if there is a terminal to be connected to the AP, performing connection to the terminal directly without having to perform a process of inputting password information of the AP.

In accordance with another aspect of the present invention, a method of providing an AP function in a portable terminal is provided. The method includes performing the AP function by using the portable terminal in an environment where an AP is not present, and if there is a terminal to be connected to the AP, performing connection to the terminal directly without having to perform a process of inputting password information of the AP.

In accordance with another aspect of the present invention, a portable terminal providing an AP function is provided. The portable terminal includes a controller for automatically performing a connection to a neighboring terminal in the presence of the neighboring terminal intending to access to the portable terminal acting as an AP.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to an apparatus and method for performing an Access Point (AP) function and for simplifying a process of connecting to a neighboring terminal (i.e., a Wi-Fi terminal) when performing the AP function in a portable terminal.

Figure 1:
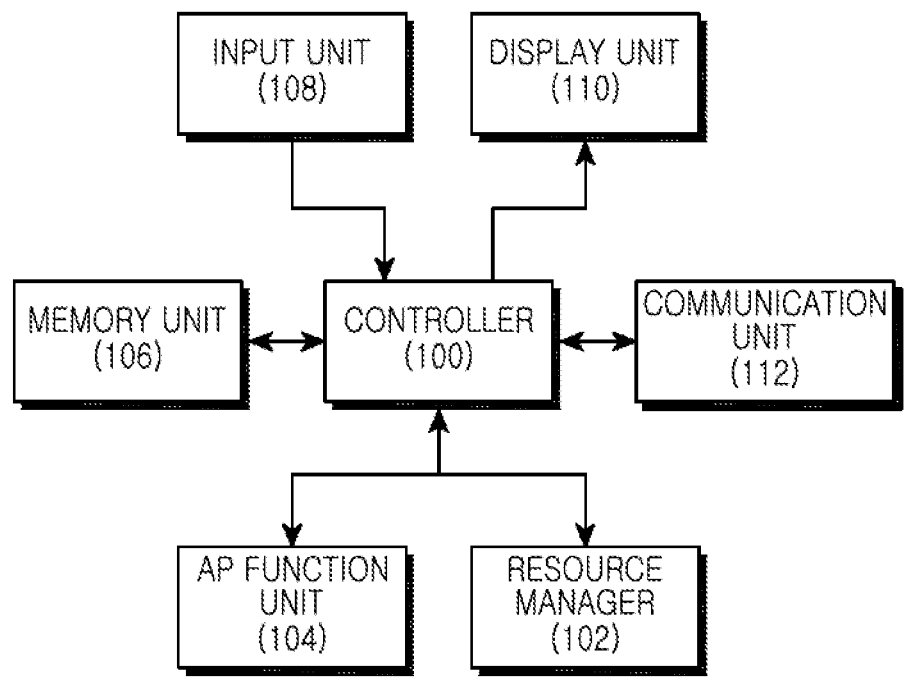
FIG. 1 is a block diagram illustrating a structure of a portable terminal for providing an Access Point (AP) function according to an exemplary embodiment of the present invention.

FIG. 1 is a block diagram illustrating a structure of a portable terminal for providing an AP function according to an exemplary embodiment of the present invention.

Referring to FIG. 1, the portable terminal includes a controller 100, a resource manager 102, an AP function unit 104, a memory unit 106, an input unit 108, a display unit 110, and a communication unit 112. The portable terminal may include additional units that are not illustrated here merely for sake of clarity. Similarly, the functionality of two or more of the above units may be integrated into a single component without departing from the spirit or scope of the present invention.

The controller 100 of the portable terminal provides overall control to the portable terminal. For example, the controller 100 processes and controls voice telephony and data communication. In addition to a typical function, the controller 100 performs an AP function in an environment where the AP is not present, and provides an Internet service by using a Wi-Fi terminal.

In addition, when the portable terminal performs the AP function, the controller 100 skips a process of directly inputting password information of the AP by a user in order to connect the portable terminal performing the AP function and the Wi-Fi terminal. As a result, a process of connecting to the Wi-Fi terminal is simplified, thereby increasing user convenience.

Now, an operation of the controller 100 will be described in detail.

When the AP function is performed under the control of the controller 100 in an environment where the AP is not present, the controller 100 provides control such that a beacon message including information of the AP function (e.g., a pre-stored Service Set IDentifier (SSID), a Basic Service Set IDentifier (BSSID), channel information, and the like) is generated, and the generated beacon message is periodically broadcast. Therefore, the Wi-Fi terminal recognizes the portable terminal as if it were an AP.

Additionally, to simplify the process of connecting to the Wi-Fi terminal, in a case where a connection request is transmitted when it is determined that the AP exists nearby through a scan process performed by the Wi-Fi terminal, the controller 100 allocates a resource for the Wi-Fi terminal and then pops up a message for reporting reception of the connection request to the user of the portable terminal, so that the user can select whether to connect to the Wi-Fi terminal.

In this case, the controller 100 provides the Internet service through a service provider's network by using the allocated resource while the user requests the connection to the Wi-Fi terminal, and thus a process of directly connecting to the Wi-Fi terminal is performed. That is, under the control of the controller 100, the user of the portable terminal does not perform a process of inputting connection information, and thus the Internet service is provided to the Wi-Fi terminal more simply than the conventional connection process.

In this case, the controller 100 controls the resource manager 102 and the AP function unit 104 to perform the aforementioned process.

Under the control of the controller 100, the resource manager 102 connects to a Dynamic Host Configuration Protocol (DHCP) server and allocates a resource for the AP function when performing the AP function. Herein, the resource allocated by the resource manager 102 is a resource to be allocated to the Wi-Fi terminal to be connected to the AP. Therefore, when the user requests the connection to the AP, the portable terminal can provide the Internet service through the service provider's network by using the resource.

Under the control of the controller 100, the AP function unit 104 generates a beacon message including the pre-stored information for the AP function and periodically broadcasts the generated beacon message so that the portable terminal is found in a process of scanning neighboring Wi-Fi terminals.

The memory unit 106 includes, for example, Read Only Memory (ROM), Random Access Memory (RAM), flash ROM, and the like. The ROM stores a microcode (i.e., code) of a program, by which the controller 100, the resource manager 102, and the AP function unit 104 are processed and controlled, and a variety of reference data.

The RAM is a working memory of the controller 100 and stores temporary data that is generated when programs are executed. The flash ROM stores a variety of rewritable data, such as phonebook entries, outgoing messages, incoming messages, and a variety of rewritable data such as information of the touch input point of the user.

The input unit 108 includes a plurality of function keys such as numeral key buttons of '0' to '9', a menu button, a cancel (or delete) button, an OK button, a talk button, an end button, an Internet access button, a navigation key (or direction key) button, a character input key, and the like. Key input data, which is input when the user presses these keys, is provided to the controller 100. These keys are merely examples of keys which may make up the input unit 108. The input unit 108 may include additional or different keys, or different input mechanisms through which the user supplies input to the portable terminal.

The display unit 110 displays information such as state information, which is generated while the portable terminal operates, limited numeric characters, large volumes of moving and still pictures, and the like. The display unit 110 may be a color Liquid Crystal Display (LCD), an Active Mode Organic Light Emitting Diode (AMOLED), and the like. The display unit 110 may include a touch input device as an input device when using a touch input type portable terminal.

The communication unit 112 transmits and receives a Radio Frequency (RF) signal of data that is input and output through an antenna (not illustrated). For example, in a transmitting process, data to be transmitted is subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data. The communication unit 112 includes a wireless Local Area Network (LAN) to transmit and receive information required to perform the AP function.

The functions of the resource manager 102 and the AP function unit 104 can be performed by the controller 100 of the portable terminal, and these elements are shown and described as being separately constructed for exemplary purposes only. Thus, those of ordinary skill in the art understand that various modifications can be made within the scope and spirit of the present invention. For example, these elements may be constructed such that their functions are processed by the controller 100.

An apparatus for performing an AP function in a portable terminal and for simplifying a process of connecting to a neighboring terminal when performing the AP function according to an exemplary embodiment of the present invention has been described above. An exemplary method of simplifying the process of connecting to the neighboring terminal when performing the AP function by using the apparatus of an exemplary embodiment of the present invention will be described below.

Figure 2:
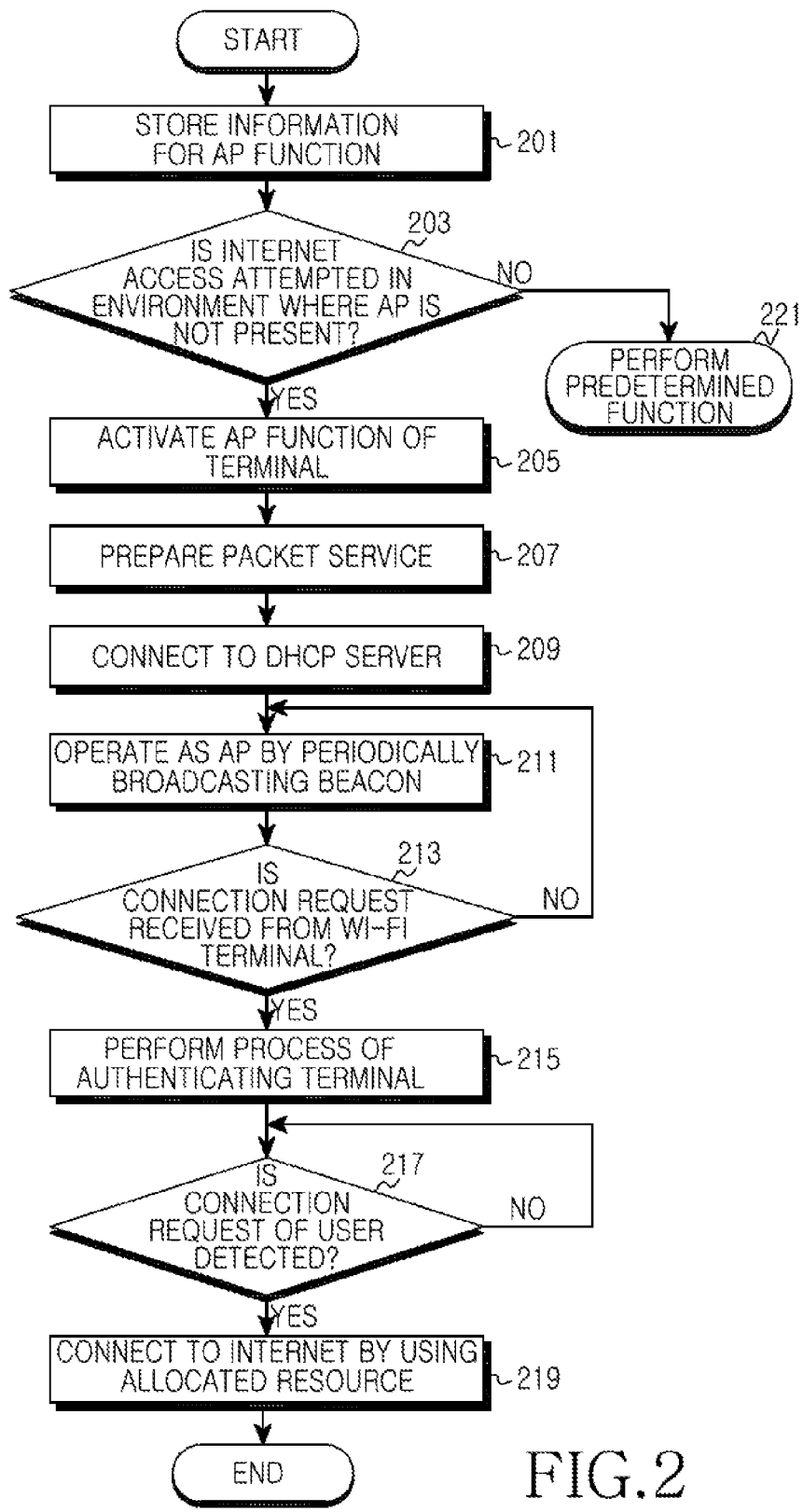
FIG. 2 is a flowchart illustrating a process of performing an AP function in a portable terminal according to an exemplary embodiment of the present invention.

FIG. 2 is a flowchart illustrating a process of performing an AP function in a portable terminal according to an exemplary embodiment of the present invention.

Referring to FIG. 2, the portable terminal stores information for the AP function in step 201, and then proceeding to step 203, determines whether there is an attempt to connect to the Internet in an environment where the AP is not present. Examples of the information for the AP function include a Service Set IDentifier (SSID), a Basic Service Set IDentifier (BSSID), channel information, and the like. The information for the AP function is pre-stored in the portable terminal so that the information is used when the AP function is performed.

If it is determined in step 203 that Internet access is attempted in an environment where the AP is present, proceeding to step 221, the portable terminal performs a predetermined function (e.g., Internet access by connecting to the AP).

Otherwise, if it is determined in step 203 that the Internet access is attempted in the environment where the AP is not present, proceeding to step 205, the portable terminal activates the AP function of the portable terminal. Herein, the portable terminal is a terminal capable of separately performing the AP function, and can perform the AP function by using the information pre-stored in step S201.

After activating the AP function, proceeding to step 207, the portable terminal prepares a packet service by performing a Universal Mobile Telecommunication System (UMTS) network attachment process.

In doing so, an Internet service is provided by using a packet service when the portable terminal operates as the AP in order to provide the Internet service to a Wi-Fi terminal in the environment where the AP is not present.

In step 209, the portable terminal connects to a DHCP server, and prepares for the AP function by allocating resources such as an Internet Protocol (IP) address and a Media Access Control (MAC) address of the Wi-Fi terminal to be connected to the portable terminal.

In step 211, the portable terminal operates as the AP, while periodically broadcasting a beacon message including information on the AP currently operating.

Accordingly, the Wi-Fi terminal neighboring to the portable terminal performing the AP function will scan the AP by determining SSID information of a portable terminal which is pre-known through a scan process, and will transmit a connection request to the portable terminal in order to connect to the AP.

In step 213, the portable terminal determines whether the connection request is received from the Wi-Fi terminal.

If the connection request is not received from the Wi-Fi terminal in step 213, the portable terminal determines that there is no neighboring Wi-Fi terminal, and then returning to step 211, repeats the process of periodically broadcasting the beacon message to allow the Wi-Fi terminal to scan the AP.

If the connection request is received from the Wi-Fi terminal in step 213, the portable terminal determines that the neighboring Wi-Fi terminal is present, and proceeding to step 215, performs a process of authenticating the terminal and then pops up a message for reporting that the portable terminal can connect to the Wi-Fi terminal.

Accordingly, the user of the portable terminal may determine the neighboring Wi-Fi terminal, and can select whether to connect to the Wi-Fi terminal.

In step 217, the portable terminal determines whether the connection request of the user is detected. In this step, a selection made by a user to determine whether to connect to the Wi-Fi terminal is detected from the message popped up by the portable terminal.

If the connection request of the user is not detected in step 217, the process of step 217 is repeated to re-determine whether the user selection is detected. Thereafter, when the user selection is not detected during a specific time period, the portable terminal optionally may determine that the user will not connect to the Wi-Fi terminal, and thus the connection process may end.

Otherwise, if the connection request of the user is detected in step 217, the portable terminal connects to the Internet in step 219 by using a service provider's network (i.e., a Universal Mobile Telecommunications System (UMTS) network) accessed in step 207 by using a resource allocated in step 209, and then the procedure of FIG. 2 ends.

Figure 3:
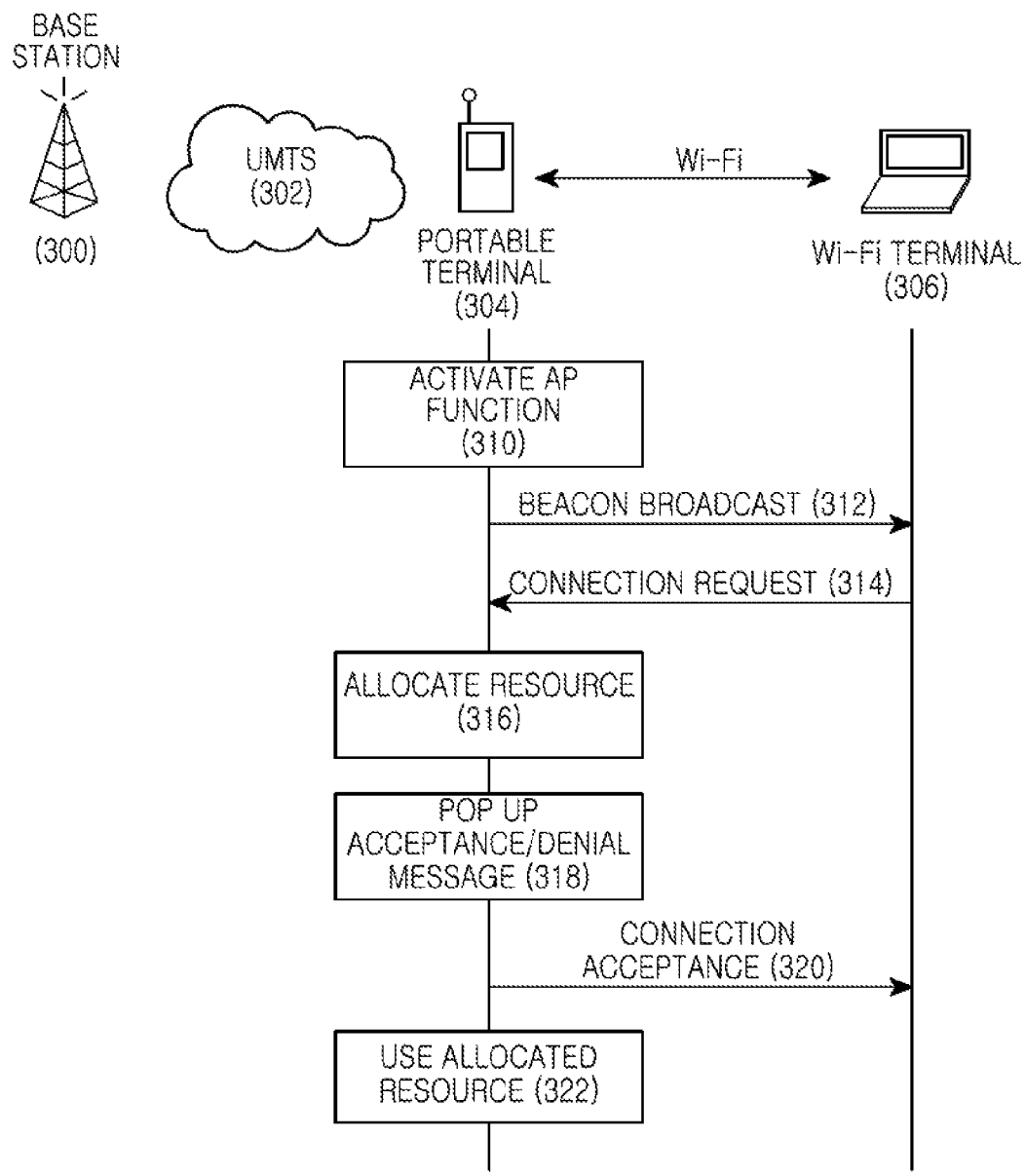
FIG. 3 illustrates a process of connecting to an AP in a mobile communication system according to an exemplary embodiment of the present invention.

FIG. 3 illustrates a process of connecting to an AP in a mobile communication system according to an exemplary embodiment of the present invention.

Referring to FIG. 3, the mobile communication system includes a Base Station (BS) 300, a portable terminal 304, and a Wi-Fi terminal 306, and can be configured in an environment where the AP is not present. The portable terminal 304 is a terminal capable of performing an AP function.

First, when a user of the portable terminal 304 intends to use the Wi-Fi terminal 306 in the environment where the AP is not present, the portable terminal 304 activates the AP function by using a pre-stored SSID and BSSID in step 310.

The portable terminal 304 performs the AP function by periodically broadcasting a beacon message in step 312.

Accordingly, the neighboring Wi-Fi terminal 306 determines that the AP exists nearby by scanning the SSID included in the beacon message transmitted by the portable terminal 304. After scanning the AP, the Wi-Fi terminal 306 transmits a connection request to the portable terminal 304 in step 314.

Upon receiving the connection request from the Wi-Fi terminal 306 as described above, the portable terminal 304 connects to a DHCP server and allocates a resource for the Wi-Fi terminal 306 in step 316, and manages the allocated resource.

Thereafter, the portable terminal 304 pups up a message for selecting whether to connect to the Wi-Fi terminal 306 in order to allow the user to select whether to connect to the Wi-Fi terminal 306, in step 318.

Accordingly, the user of the portable terminal 304 determines whether to connect to the neighboring Wi-Fi terminal 306.

If the user of the portable terminal 304 accepts the connection to the Wi-Fi terminal 306, the portable terminal 304 transmits a message for reporting connection acceptance to the Wi-Fi terminal 306 in step 320, and the portable terminal 304 provides an Internet service through a UMTS network 302 by using the Wi-Fi terminal's resource, allocated in the resource allocation process, in step 322.

By performing the aforementioned operation, the portable terminal 304 performs the AP function in a situation where the AP is not present. Further, by simplifying a process of connecting the portable terminal 304 performing the AP function and the Wi-Fi terminal 306, an Internet service can be used conveniently.

According to exemplary embodiments of the present invention, an apparatus and method for performing an AP function in a portable terminal and for simplifying a process of connecting to a neighboring terminal when performing the AP function have been described above. Therefore, a resource for a neighboring terminal of the portable terminal is allocated, and thereafter the resource is used to connect to a service provider's network connected to the portable terminal. As a result, the portable terminal can be reliably connected to an AP without having to perform a connection information input process which has been manually performed when the conventional portable terminal is connected to the AP.

While exemplary embodiments of the present invention have been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A portable terminal for performing voice call and data communication, the portable terminal comprising:
   a memory configured to store information for an access point (AP) function is pre-stored in the portable terminal, the information being used when the AP function is performed;
   a first communication unit configured to perform a packet service through a first network;
   a second communication unit configured to establish a communication between the portable terminal and a peripheral device through a second network; and
   a processor configured to, in response to providing the AP function:
      periodically broadcast a beacon message including service set identifier (SSID) information of the portable terminal,
      in response to receiving a connection request from the peripheral device through the second network, display a message for indicating that the portable terminal is in a state to connect to the peripheral device for responding to the connection request from the peripheral device,
      in response to receiving an input for selecting a connection to the peripheral device from the message, establish the second network between the portable terminal and the peripheral device without requiring receipt of password information from the peripheral device,
      allocate an internet protocol (IP) address of the peripheral device, and
      receive and transmit data from and to the peripheral device using the IP address allocated by the portable terminal,
   wherein the receive and transmit of data from and to the peripheral device using the IP address allocated by the portable terminal comprises:
      in response to receiving data from the first network, transmit the received data to the second network using the IP address allocated by the portable terminal, and
      in response to receiving data from the second network using the IP address allocated by the portable terminal, transmit the received data to the first network.

2. The portable terminal of claim 1, wherein the beacon message includes pre-stored information used for the AP function.

3. The portable terminal of claim 1, wherein upon not receiving the input for selecting the connection to the peripheral device from the message within a predetermined time period, the processor is further configured to determine that the connection between the peripheral device and the portable terminal will not be established.

4. The portable terminal of claim 1, wherein the terminal comprises a Wi-Fi terminal.

5. The portable terminal of claim 1, wherein the second network comprises a Wi-Fi network.

6. The portable terminal of claim 1, wherein the first network comprises a universal mobile telecommunications service (UMTS) network.

7. A method of a portable terminal for performing voice call and data communication, the method comprising:
   establishing a first network;
   periodically broadcast a beacon message including service set identifier (SSID) information of the portable terminal;
   in response to receiving a connection request from a peripheral device, displaying a message for indicating that the portable terminal is in a state to connect to the peripheral device for responding to the connection request from the peripheral device;
   in response to receiving an input for selecting a connection to the peripheral device, establishing a second network between the peripheral device and the portable terminal without requiring receipt of password information from the peripheral device;
   allocating an internet protocol (IP) address of the peripheral device; and
   receiving and transmitting data from and to the peripheral device using the IP address allocated by the portable terminal,
   wherein the receiving and transmitting of data from and to the peripheral device using the IP address allocated by the portable terminal comprises:

in response to receiving data from the first network, transmitting the received data to the second network using the IP address allocated by the portable terminal, and in response to receiving data from the second network using the IP address allocated by the portable terminal, transmitting the received data to the first network.

8. The method of claim 7, wherein the beacon message includes pre-stored information used for an access point (AP) function.

9. The method of claim 7, further comprising, upon not receiving the input for selecting the connection to the peripheral device within a predetermined time period, determining that the connection between the peripheral device and the portable terminal will not be established.

10. The method of claim 7, wherein the terminal comprises a Wi-Fi terminal.

11. The method of claim 7, wherein the second network comprises a Wi-Fi network.

12. The method of claim 7, wherein the first network comprises a universal mobile telecommunications service (UMTS) network.

13. A portable terminal providing an access point (AP) function, the portable terminal comprising:
a processor configured to:
provide the AP function by periodically broadcasting a beacon message including service set identifier (SSID) information of the portable terminal,
in response to receiving a connection request from a neighboring terminal, display a message for responding to a connection request from the neighboring terminal,
allocate an internet protocol (IP) address for the neighboring terminal intending to access the AP function of the portable terminal, and
in response to receiving an input for selecting to establish the connection between the neighboring terminal and the portable terminal, control to establish an authenticated connection to the neighboring terminal intending to access the AP function of the portable terminal without requiring receipt of password information from the neighboring terminal, and
receive and transmit data from and to the neighboring terminal using the allocated IP address.

14. The portable terminal of claim 13, wherein the beacon message includes pre-stored information used for the AP function.

15. The portable terminal of claim 14, wherein the connection request from the neighboring terminal is received in response to the beacon message.

16. The portable terminal of claim 13, wherein upon not receiving the input for selecting to establish the connection between the neighboring terminal and the portable terminal within a predetermined time period, the processor is further configured to determine that the connection to the neighboring terminal will not be established.

17. The portable terminal of claim 13, wherein the neighboring terminal comprises a Wi-Fi terminal.

18. The portable terminal of claim 13, wherein the portable terminal provides the neighboring terminal with an Internet service through a universal mobile telecommunications service (UMTS) network.

19. A method of providing an Access Point function in a portable terminal, the method comprising:
performing the access point (AP) function of the portable terminal in an environment where an AP is not present by
periodically broadcasting a beacon message including service set identifier (SSID) information of the portable terminal;
upon a terminal attempting to connect to the AP, displaying a message to authenticate the terminal attempting the connection without requiring receipt of password information from the terminal;
allocating an internet protocol (IP) address for the terminal attempting to connect to the AP;
receiving data from the terminal using the allocated IP address; and
in response to receiving an input for selecting to establish the connection between the terminal attempting to connect to the AP and the portable terminal, providing an Internet service to the terminal using the received data,
wherein the providing of the Internet service to the terminal comprises transmitting data to the terminal using the allocated IP address.

* * * * *